United States Patent Office 2,775,611
Patented Dec. 25, 1956

2,775,611

PREPARATION OF CYANO ORGANICSULFONYL CHLORIDES

Frederick Comte, Kirkwood, Mo., assignor to Monsanto Chemical Company, St. Louis, Mo., a corporation of Delaware No Drawing. Application July 8, 1954,
Serial No. 442,213

6 Claims. (Cl. 260—465)

This invention related to the preparation of cyano organicsulfonyl chlorides and more particularly pertains to an improved process for preparing cyano organicsulfonyl chlorides from trichlorophosphazo organic acyl chlorides.

Because of the presence of two exceedingly reactive groups in cyano organicsulfonyl chlorides $$NC-A-SO_2Cl$$

wherein A is a divalent organic group; these compounds are exceptionally useful as intermediates in the synthesis of other organic chemical compounds. For example, cyano organicsulfonyl chlorides such as p-cyanobenzenesulfonyl chloride can be used as an intermediate in the preparation of alkyl substituted sulfamyl derivatives of organic acids such as p-(di-n-propylsulfamyl) benzoic acid by reacting a primary or secondary amine with the cyano organicsulfonyl chloride in an alkaline medium, for example in the presence of sodium hydroxide, and acidifying the resulting product. The cyano group can be reduced to form a primary methyl amino group, or it can be reacted with an alcohol to form an imido ester group, or it can be oxidized to an isocyano group which reacts with alcohols to form urethanes or with ammonia or amines to form ureas, or the cyano group can be utilized in any other of the nitrile reactions. Likewise the sulfonyl chloride group can be utilized in the preparation of an unsubstituted sulfonamide group as well as mono- and di-substituted sulfonamide groups, or in the preparation of esters by the reaction of the sulfonyl chloride group with an alcohol or in the preparation of numerous other groups by utilizing the reactivity of the sulfonyl chloride group.

In general, the process of this invention is an improved process for preparing cyano organicsulfonyl chlorides from trichlorophosphazo organic acyl chlorides. The conversion of a trichlorophosphazosulfonyl organic acyl chloride to a cyano organicsulfonyl chloride takes place according to the following reactions,

wherein A is a divalent organic group. The precise reaction mechanics of the above conversion reaction has not been definitely established. Considerable evidence has been presented to indicate that the conversion involves an intermolecular reaction although the possibility of an intramolecular rearrangement or reaction has not been positively overruled. However, the process of this invention is not dependent upon the precise mechanics of the conversion of the trichlorophosphazo acyl chloride.

One method suggested for the conversion of a trichlorophosphazosulfonyl organic acyl chloride to a cyano organicsulfonyl chloride is to merely heat the dry solid precursor to a temperature of at least 200° C. Another method suggested for this conversion is to heat a solution of the precursor, a trichlorophosphazosulfonyl organic acyl chloride, in dry carbon tetrachloride to a temperature of 200° C. or above. The latter process would of course have to be carried out under pressure. Both of these methods suggested for achieving the desired conversion reported substantially quantitative yields of the cyanoaromatic sulfonyl chloride. However, it has been found that quantities greater than about 0.1 gram mole of the trichlorophosphazosulfonyl organic acyl chloride heated according to either of the suggested methods give very erratic results. For example the conversion will begin at 150° C. one time, 190° C. at another time and at a temperature of above 200° C. at still another time. Also, the erratic nature of the conversion reaction plus the exothermic nature of this reaction makes the control of the reaction temperature difficult causing a substantial portion of the desired product to be decomposed to a cyano organic chloride through the destruction of the sulfonyl chloride group splitting out SO₂ because of excessively high temperatures developed. Obviously large scale production of a cyano organicsulfonyl chloride cannot be successfully achieved by either of the suggested methods for accomplishing the conversion at any known or predictable temperature.

It is an object of this invention to provide an efficient process for converting a trichlorophosphazosulfonyl organic acyl chloride to a cyano organicsulfonyl chloride at a predeterminable and certain temperature. It is also an object of this invention to provide a conversion process which will be reproducible at any desired temperature. Other objects of this invention will be obvious from the description hereinafter appearing.

It has been discovered that the conversion of trichlorophosphazosulfonyl organic acyl chlorides having the formula $$Cl_3P=N-O_2S-A-COCl$$

wherein A is a divalent organic group, to the corresponding cyano sulfonyl chloride can be accomplished by heating said trichlorophosphazosulfonyl acyl chloride in the presence of from 0.1 to 2.0% by weight of water as a conversion moderator. The reaction can be carried out in the presence of a reaction diluent which may be a solvent for either the starting material or the end product. However, the diluent need not be a solvent for any of the chemical compounds present.

In general the process of this invention is carried out by heating the trichlorophosphazosulfonyl organic acyl chloride to the desired conversion temperature, under 200° C. and then adding water in a catalytic amount, e. g. 0.1% to 2.0% by weight based on the trichlorophosphazosulfonyl organic acyl chloride. By following the process of this invention, temperatures of 200° C. or above are not involved and consequently the formation of cyano organic chlorides by splitting out of SO₂ does not take place, and the resulting formation of undesirable by-products such as cyano organic chloride and tarry materials by side reactions is substantially eliminated. In the preferred process of this invention usually the use of water from about 0.1% to 0.5% by weight based on the trichlorophosphazo compound will give satisfactory results at temperatures of from 150° to 190° C. In general, the trichlorophosphazosulfonyl organic acyl chloride is heated in the presence of water added per se or added as moist air and a substantially pure cyano organicsulfonyl chloride is produced at conversion temperatures as low as 150° C. and up to as high as 190° C. Further, according to the process of this invention, the phosphoryl chloride split out during the conversion is removed under reduced pressure of from 75 to 200 mm. Hg absolute. However, substantially equivalent results can be obtained at higher pressures, that is, from 200 mm. Hg absolute to atmospheric pressure, but of course in a longer time. The process of this invention will be described and illustrated in greater detail in the specific examples hereinafter appearing.

Trichlorophosphazosulfonyl organic acyl chlorides which can be converted to cyano organic chlorides according to this invention are those having the formula,

$$Cl_3P=N\text{---}O_2S\text{---}A\text{---}COCl$$

wherein A is a divalent organic group. The divalent group A can be aliphatic or aromatic groups including alkyl, alicyclic including groups derived from naphthenes, aryl, alkaryl and aralkyl hydrocarbon groups as well as such groups containing non-hydrogen substituents such as halogens, ether and thioether substituents such as alkoxy, aryloxy, alkythio and arylthio, nitro, amino, among others. Such groups as the hydroxy, carboxy, amino, monosubstituted amino and other reactive groups can also be present, however, such reactive groups are generally displaced during the preparation of the trichlorophosphazosulfonyl organic acyl chloride which is accomplished by reacting a sulfonyl organic carboxylic acid with phosphorous pentachloride. Although the above formula indicates the presence of only one trichlorophosphazosulfonyl group, $Cl_3P=N\text{---}O_2S\text{---}$, and one acyl chloride group, the process of this invention is not limited solely thereto for compounds containing more than one of either of these groups can be employed in the process of this invention.

Typical trichlorophosphazosulfonyl organic acyl chloride reactants which can be employed in the process of this invention include among others trichlorophosphazosulfonyl acetyl chloride, 3-trichlorophosphazosulfonyl propionylchloride, trichlorophosphazosulfonyl stearylchloride, trichlorophosphazosulfonyl cyclopentane acyl chloride, p-(trichlorophosphazosulfonly) cyclohexane acyl chloride, p(trichlorophosphazosulfonyl) benzoylchloride, 7-trichlorophosphazosulfonyl-3-phenanthrene acyl chloride, 4-trichlorophosphazosulfonyl-1-naphthoylchloride, 5-trichlorophosphazosulfonyl-1-naphthoxychloride, trichlorophosphazosulfonyl-nicotinylchloride, di-(trichlorophosphazosulfonyl) phthalylchlorides, 4,5-di(trichlorophosphazosulfonyl) - 1,8 naphthalylchloride, trichlorophosphazosulfonyl cyclohexyl acetyl chloride, β-(p-trichlorophosphazosulfonylbenzoyl) propionyl chloride, trichlorophosphazosulfonyl nitrobenzoyl chloride, trichlorophosphazosulfonylchlorobenzoyl chloride, trichlorophosphazosulfonylchlorocyclohexane acetyl chloride, and 5-(trichlorophosphazosulfonyl)-2-furyl chloride.

The following examples are illustrative of the process of this invention. In these examples all parts are by weight.

*Example I*

There is heated 429 parts of a mixture containing 263 parts p-trichlorophosphazosulfonyl benzoyl chloride and 166 parts of phosphoryl chloride in suitable distillation equipment at about 60–65° C. and a reduced presure of 200 mm. Hg until about 90% of the phosphoryl chloride has been distilled off. Thereafter the temperature is increased to 190° C. whereupon 1.0 part of water is added dropwise. After a few drops of water are added, POCl₃ is split out by the rearrangement reaction and again distills off. The reaction medium is maintained at 200 mm. Hg and 190° C. for about 3 hours, the pressure is then further reduced to 100 mm. Hg and held there for about one hour. The residual material is cooled to 50° C. and 156 parts of toluene is added thereto. The resulting mixture is heated to 70° C., filtered and the filter cake is washed with 56 parts of hot toluene (65° C.). There is recovered a toluene solution of which 212 parts are toluene and 147.3 parts are p-cyanobenzenesulfonyl chloride a yield of 99%.

*Example II*

A suitable reactor having a distillation head containing 5065 parts of a mixture containing 2247 parts of p-trichlorophosphazosulfonyl benzoyl chloride and 2818 parts of phosphoryl chloride is heated at 200 mm. Hg until about 2755 parts of phosphoryl chloride is distilled off beginning at about 75° C. and ending at a temperature of about 150° to 152° C. Then 10 parts of water are added over a period of one hour while slowly increasing the temperature to 160° and while maintaining a pressure of 200 mm. Hg absolute. As soon as a few parts of water are added, the rearrangement reaction begins and POCl₃ is split out. The reaction temperature is gradually increased to 170° to 172° C. to maintain as high a rate of distillation and removal of POCl₃ as is practical. When rate of POCl₃ distillation decreases, again the pressure is reduced to 100 mm. Hg absolute and held there until POCl₃ no longer distills off. The residue in the reactor is cooled to about 50° C., dissolved in toluene, heated to 70° C. and filtered. The filter cake is washed with hot toluene. The toluene is distilled off at reduced pressure leaving about 1280 parts, a yield of about 98%, of substantially pure p-cyanobenzenesulfonyl chloride.

*Example III*

The process of Example I is repeated except that moist air is added in place of the water by drawing the air through the residue in the still when the distillation temperature had reached 190° C. at 200 mm. Hg absolute. The yield of p-cyanobenzenesulfonyl chloride recovered is about 95%.

*Example IV*

The process of Example I is repeated except that 2.0 parts of water are added in place of the 1.0 part of water when the distillation temperature had reached 180° C. at 200 mm. Hg absolute. The yield of p-cyanobenzenesulfonyl chloride recovered is about 98%.

*Example V*

To prepare 2-cyano-5-furansulfonyl chloride, one mole of 5-(trichlorophosphazosulfonyl)-2-furyl chloride in 503 parts of phosphoryl chloride obtained by the reaction of about 2.5 moles of PCl₅ with one mole of 2-sulfamyl-5-furoic acid in the presence of 350 parts of POCl₃, is heated in suitable distillation equipment at 200 mm. Hg until about 450 parts of POCl₃ is distilled off between a temperature of 75° C. and 160° C. While maintaining a temperature of about 160° C. and 200 mm. Hg pressure, moist air is drawn through the residue in the still pot. The rate of distillation of phosphoryl chloride increases again indicating that the rearrangement reaction is taking place splitting out POCl₃. When the distillation of POCl₃ apparently stops, the pressure in the distillation equipment is reduced to about 100 mm. Hg absolute for about an hour and no heat is supplied to the still pot. The residue in the still pot is cooled to about 50° C. and then dissolved in toluene and the resulting solution filtered. 2-cyano-5-furansulfonyl chloride can be recovered by distilling off the toluene at reduced pressure.

2-cyano-5-furansulfonyl chloride,

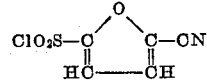

can be converted to 5-(di-n-propyl) sulfamyl-2-furoic acid, a compound similar to Benemid, by reaction with di-n-propylamine in the presence of sodium hydroxide followed by acidification with hydrochloric or sulfuric acid.

*Example VI*

1,8-dicyano-naphthalene-4,5-disulfonylchloride is prepared by heating 0.25 mole of 4,5-di(trichlorophosphazosulfonyl) 1,8-naphthalyl dichloride obtained from the reaction of 0.25 mole 4,5-disulfamyl-1,8-naphthoic acid and 1.25 moles of PCl₅ in POCl₃ after removing the free POCl, to about 175° C. at 200 mm. Hg absolute drawing moist air therethrough and removing the POCl₃ split out as rapidly as possible. When POCl₃ is no longer evolved, the residue is held at about 90 mm. Hg absolute until its temperature is about 50° C., dissolved in toluene and filtered. The desired product can be obtained from the toluene solution by the recovery of the toluene at reduced pressure.

*Example VII* p-Cyanocyclohexanesulfonyl chloride is obtained from p-trichlorophosphazosulfonylcyclohexyl acyl chloride, prepared by reacting $PCl_5$ with p-sulfamylcyclohexane carboxylic acid, by heating at 160° C. at about 180 mm. Hg absolute and, while maintained at these conditions, adding thereto about 0.5 part of water per 100 parts of trichlorophosphazosulfonylcyclohexyl acyl chloride. The $POCl_3$ evolved is distilled off substantially as rapidly as formed. When $POCl_3$ is no longer evolved, the pressure is further reduced to about 85 mm. Hg and there maintained until the residual material is cooled to about 50° C. The residue is dissolved in toluene, filtered and the toluene removed at reduced pressure. The solid residue is the desired product.

*Example VIII*

4-trichlorophosphazosulfonyl-2-nitrobenzoyl chloride, obtained by reacting 4-sulfamyl-2-nitrobenzoic acid with $PCl_5$ is heated to 150° C. at about 190 mm. Hg absolute with the slow addition of about 0.3% by weight of water while removing the $POCl_3$ formed as rapidly as possible. When $POCl_3$ no longer evolves, the resulting residue is held at a pressure of about 100 mm. Hg absolute without heating until the temperature of the residue reaches 50° C. The residue is dissolved in toluene at about 75° C. and the hot solution filtered. The 4-cyano-2-nitrobenzenesulfonyl chloride produced can be obtained by heating the solution under reduced pressure to recover the toluene.

What is claimed is:

1. In the preparation of a cyanoorganicsulfonyl chloride by heating a trichlorophosphazosulfonyl organic acyl chloride, the step comprising heating said trichlorophosphazosulfonyl organic acyl chloride at a temperature of from 150° to 190° C. in the presence of a catalytic amount of water of from about 0.1% to about 2% by weight and removing the $POCl_3$ as rapidly as formed.

2. The process of claim 1 wherein the $POCl_3$ is removed at reduced pressure of from 75 to 200 mm. Hg absolute.

3. The process of claim 1 wherein the $POCl_3$ is removed at reduced pressure of from 75 to 200 mm. Hg absolute and the water is added as moist air.

4. In the preparation of p-cyanobenzenesulfonyl chloride by heating p-trichlorophosphazosulfonyl benzoyl chloride and splitting out $POCl_3$, the step comprising heating p-trichlorophosphazosulfonyl benzoyl chloride in the presence of from 0.1% to 2.0% by weight of water at a temperature of from 150° to 190° C. and a pressure of from 75 to 200 mm. Hg absolute while removing $POCl_3$ as rapidly as evolved.

5. The process of claim 4 wherein the water is added dropwise.

6. The process of claim 4 wherein the water is added as moist air.

References Cited in the file of this patent

Kirsanov: Chem. Abst., vol. 46, column 11135 (1952).